United States Patent [19]

Wladimiroff

[11] Patent Number: 4,730,138

[45] Date of Patent: Mar. 8, 1988

[54] COAXIAL MOUNTING METHOD

[76] Inventor: Wladimir Wladimiroff, Kyrkbacken 27, S-17150 Solna, Sweden

[21] Appl. No.: 692,742

[22] Filed: Jan. 18, 1985

[51] Int. Cl.⁴ ............................ H01J 5/12; H01S 3/03
[52] U.S. Cl. ....................................... 313/312; 372/65; 384/49
[58] Field of Search ........................ 313/324, 482, 312; 372/109, 61, 107, 34, 65; 248/603, 604; 384/49

[56] References Cited

U.S. PATENT DOCUMENTS

| | | | |
|---|---|---|---|
| 2,406,069 | 11/1944 | Freeman | 308/184 |
| 3,739,297 | 6/1973 | Mark | 372/61 |
| 3,875,530 | 4/1975 | Manoukian | 372/65 |
| 4,190,810 | 2/1980 | Bayley | 372/61 X |
| 4,357,649 | 11/1982 | La Croix | 372/109 X |
| 4,365,335 | 12/1982 | Lamboo | 372/107 X |
| 4,481,633 | 11/1984 | McMahan | 372/61 X |

FOREIGN PATENT DOCUMENTS

| | | | |
|---|---|---|---|
| 465076 | 8/1951 | Italy | 384/49 |
| 254046 | 12/1948 | Switzerland | 384/49 |
| 995478 | 6/1965 | United Kingdom | 384/49 |
| 1396220 | 6/1975 | United Kingdom | |

Primary Examiner—David K. Moore
Assistant Examiner—Sandra L. O'Shea
Attorney, Agent, or Firm—Pollock, Vande Sande & Priddy

[57] ABSTRACT

Apparatus for securing a fragile cylindrical tube within an envelope by using at least two spaced-apart mounting rings which tend to center the tube within the envelope. Each mounting ring is provided with three radially-extending through-holes, and an elastic sphere having a diameter greater than the thickness of the ring placed in each through-hole is in contact with the inner surface of the envelope and the outer surface of the tube, thus centering the tube within the envelope.

6 Claims, 5 Drawing Figures

COAXIAL MOUNTING METHOD

FIELD OF THE INVENTION

This invention relates to a means for mounting fragile cylindrical objects in an outer cylindrical metal or plastic cover, especially laser plasma tubes in a surrounding envelope. When mounting laser plasma tubes in a surrounding envelope it is essential that the fragile plasma tube is suspended in a flexible and still sturdy mount, which as much as possible isolates the laser tube mechanically from the envelope.

DESCRIPTION OF THE PRIOR ART

In prior art mounting methods essentially three methods of mounting laser plasma tubes—mainly helium-neon laser tubes made of glass—in cylindrical metal envelopes have been used. In the first method on two places along the outside of the laser plasma tube three or more bits of double-sided adhesive tape are placed onto the periphery of the laser tube. Onto these bits of adhesive tape small, plane or curved metal rectangles are mounted. The double-sided adhesive tape is chosen to be relatively thick and elastic. With said metal rectangles—preferably made of soft aluminium sheet—mounted along the laser tube, the laser tube is pushed into the surrounding envelope until a position is reached which corresponds with screws mounted radially through the wall of the envelope. Said screws are made to press against said metal rectangles, in this way keeping the laser tube in a stable position. This method is quite cumbersome as the position of the metal rectangles and the position of the screws must be made to correspond.

According to the second method the laser tube is positioned inside the metal envelope and through radial holes in the envelope silicon rubber is injected into the annular space between the laser tube and the envelope. Once the silicon rubber has cured the laser tube is permanently suspended inside the surrounding metal envelope. A drawback of this method is the need for a special positioning and centering jig, through which the silicon rubber can be injected. Another drawback is the circumstance that once the silicon rubber has cured it is virtually impossible to remove the laser plasma tube from the metal envelope in one piece, as the silicon rubber penetrates so far into said annular space that it can not be removed through said radial holes. Finally this method is time consuming as the positioning and centering jig can not be removed before the silicon rubber has cured.

In the third prior art method the laser tube is mounted into two well-fitting plastic rings. The inner diameter of said rings is slightly larger than the outer diameter of the laser plasma tube and this inner diameter is fitted with an O-ring groove. The outer diameter of said rings is made to fit the inner diameter of the metal envelope. Two of said rings are fitted along the laser tube, which is then pushed into the metal envelope and kept in place with screws through the envelope. This mounting method results in the obstruction of the passage for electrical leads or mechanical spacers through annular space between the laser tube and the surrounding envelope. This makes it difficult to provide electrical connections between the front and the back end electrodes of the laser tube. Another drawback—which is shared with the first mounting method described above—is the risk of leakage of moisture or other contamination through the radial holes in the surrounding envelope. The purpose of the present invention is therefore to describe a cheap and uncomplicated means of mounting a laser plasma tube inside a surrounding cylindrical envelope, enabling the user of the laser unit to easily change the plasma tube. Another purpose of the invention is to describe a self-centering mounting means. Still other aims of the present invention are that neither special tools or jigs for mounting the laser plasma tube nor radial holes through the surrounding envelope are needed. Further there is to be no obstruction of the passage for electrical connections or other means through the annular space between the laser tube and the inside of the surrounding envelope.

SUMMARY OF THE INVENTION

According to the invention the mounting of a laser tube begins with placing a ring-shaped holder at each end of the laser tube. Each holder has three cylindrical holes drilled radially through and in each hole an elastic sphere is placed. Said holders have an inner diameter which is slightly larger than the outer diameter of the laser tube and have an outer diameter which is slightly smaller than the inner diameter of the surrounding envelope. Said elastic spheres will therefore be pressed against both the laser tube and against the inside of the envelope. By placing the spheres evenly around the laser tube—that is separated by 120 degrees—said spheres will automatically center the laser tube inside the surrounding envelope. As said spheres only occupy part of the holders circumference, axial holes can be drilled through the holder for the passage of electrical leads, mechanical spacers or other means. The ring-shaped holders are preferrably made of a plastic material with a low friction coefficient. Before mounting the laser tube in its cylindrical envelope the spheres can be prevented from falling out of the holders by applying a thin (one-sided) adhesive tape around the outer periphery of the holders. Once the electrical leads and mechanical spacers have been put into place the laser tube with the two spacers is pushed into the surrounding envelope. The tape has been chosen to slide easily along the inside of the envelope and thus this method of mounting the laser tube is both fast, cheap and uncomplicated.

The invention is further described referring to FIGS. 1-5.

DESCRIPTION OF THE PREFERRED EMBODIMENT OF THE PRESENT INVENTION

Figure 1:
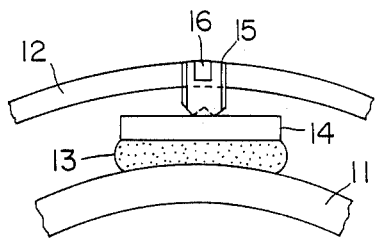
FIG. 1 shows a prior art mounting in detail.

FIG. 1 illustrates one of the prior art mounting methods in which bits of double-sided adhesive tape 13 are placed on the laser tube surface 11. On the other side of the adhesive tape a metal rectangle 14 is mounted. In threaded holes 15 through the envelope 12 screws 16 are made to correspond with the position of the metal rectangles 14. Normally three or more of these metal rectangle/screw pairs are applied at both ends of a laser unit. By adjusting the screws the laser tube can be centered. Once the laser tube is centered the screws can be locked with paint or cyano-acrylate. When the need to change the laser tube arises, it can be cumbersome to loosen the screws, which have a tendency to be locked too well. Another problem is the positioning of the adhesive tape bits 13 so that they correspond with the position of the threaded holes 15 in the envelope. A clear risk for damaging the laser tube lies in the centering operation, when the screws 15 have to be tightened just enough, but no further.

Figure 2:
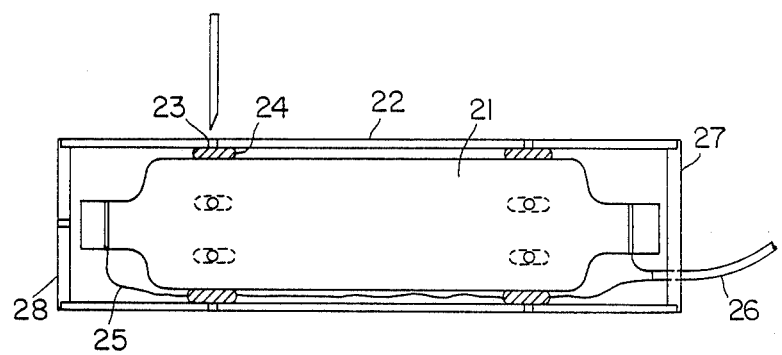
FIG. 2 shows a laser tube in a surrounding envelope, through which silicon rubber is injected.

FIG. 2 illustrates another prior art mounting method in which a laser tube 21 is placed in a jig, not shown in this figure. The laser tube is centered in the surrounding envelope 22 and through injection holes 23 silicon rubber 24 is injected into the annular space between the laser tube and the envelope. Once the silicon rubber "cushions" 24 have cured, they form a permanent suspension for the laser tube. This method of mounting laser tubes makes it virtually impossible to change the tube without destroying it. Another drawback of this method is the curing time of the silicon rubber cushions 24, which becomes a cost-increasing factor.

Figure 3:
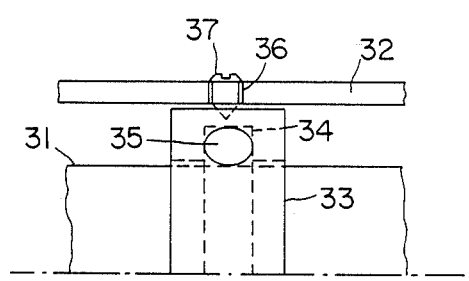
FIG. 3 shows a prior art mounting ring with O-ring groove.

FIG. 3 illustrates a third prior art mounting method in which a plastic ring 33 with O-ring groove 34 and O-ring 35 is placed at eah end of a laser tube 31. The outer diameter of ring 33 has to be slightly smaller than the inner diameter of envelope 32. The rings are locked with screws 36 in threaded holes 37. This mounting method has a couple of drawbacks. Electrical leads have to pass either under the O-ring (which means loss of centerity) or between the inside of the envelope 32 and the outer periphery of the O-ring, that is through an axial groove made for this purpose. Since relatively high voltages are often applied to start and drive the laser tube, all electrical leads must be properly insulated, which would mean that the distance between the O-ring 35 and the inside of a metal envelope 32 must be made large. Another drawback of this mounting method—shared with the method of FIG. 1—is the need for holes through the surrounding envelope. There is always a risk that moisture or other contaminations in due course will penetrate into the envelope and endanger the laser function. Under all circumstances such holes seriously complicate the manufacture of watertight laser envelopes.

Figure 4:
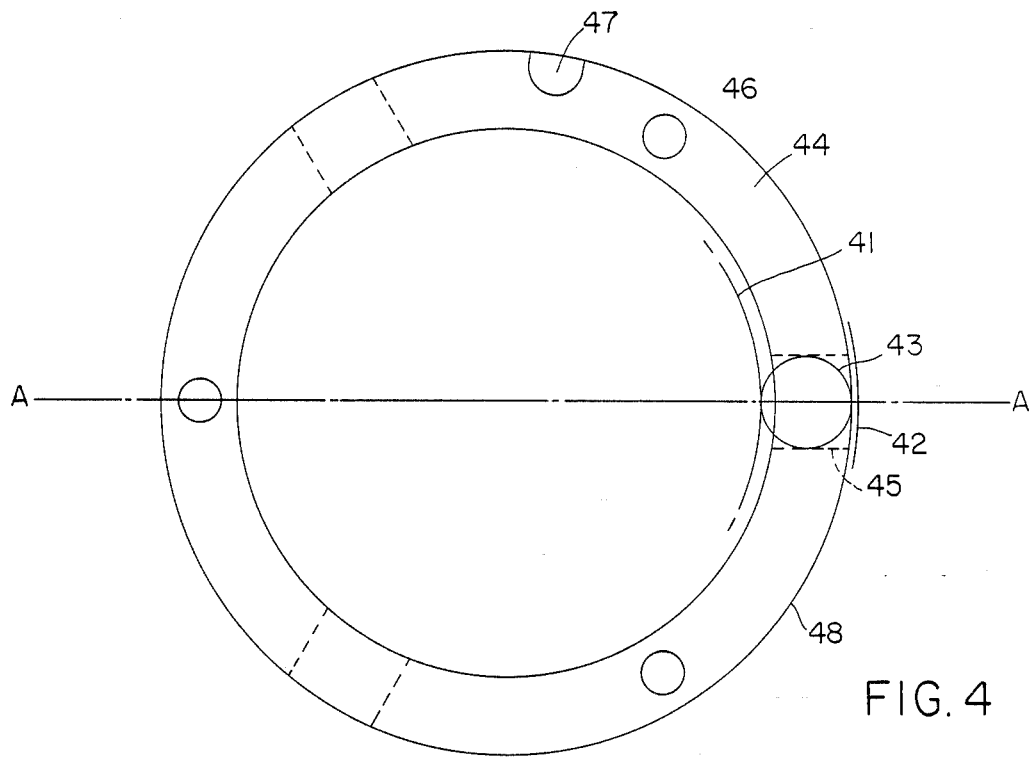
FIG. 4 shows a plan view of a ring-shaped holder according to the present invention and FIG. 5 shows a cross-section of the same ring-shaped holder.

FIG. 4 illustrates a means according to the present invention of mounting a fragile laser plasma tube inside a surrounding envelope. A ring-shaped holder 44 is placed over a laser tube 41. The holder 44 has three radially oriented cyindrical holes 45 in which elastic spheres 43 are placed, one sphere in each hole. Typically useful plastic spheres are those made of rubber, silicon rubber or plastic. Each of the elastic spheres 43 has a diameter larger than half the difference between inner diameter of laser tube 41 and smaller then the diameter of holes 45. The diameter of said holes 45 is larger than the distance between the outer surface of the laser tube 41 and the inner surface 42 of the envelope. In addition to the radial holes 45, the holders can be fitted with longitudinally oriented holes 46 and 47. Through holes 46 mechanical spacers can be fitted which control the axial position of said holders 44. Through holes 47 electrical leads and mechanical spacers can be made to pass from one end of the laser tube to the other. By applying three elastic spheres evenly spaced around the periphery of the laser tube—that is separated by 120 degrees, the laser tube will automatically center inside the envelope. The holder 44 is preferably made of an electrically insulating plastic material with low friction coefficient.

Figure 5:
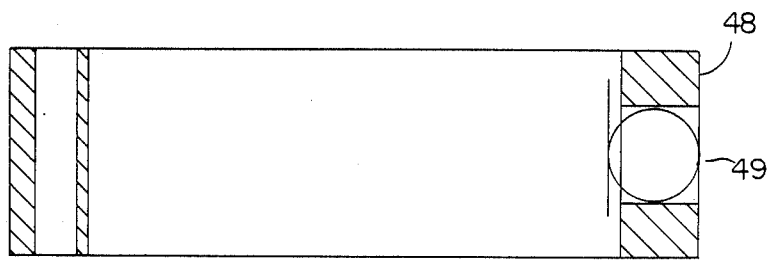

FIG. 5 shows a cross-section of the holder of FIG. 4. By applying a thin adhesive tape around the periphery 48 of the holder the elastic spheres 43 are prevented from falling out of their holes 45 and the whole package consisting of laser tube, two holders with elastic spheres and spacers can be easily pushed into the surrounding envelope.

I claim:

1. Apparatus for securing a fragile cylindrical tube within a cylindrical envelope comprising at least two spaced apart mounting means disposed along the length of said tube and between said tube and said envelope, each of said mounting means comprising:
   (a) a ring-shaped holder having an inner diameter greater than the outer diameter of said tube, and an outer diameter smaller than the inner diameter of said envelope, said ring-shaped holder further being provided with three radially-oriented cylindrical through-holes, and
   (b) an elastic sphere disposed in each of said cylindrical through-holes for pressing against an outer portion of said tube and an inside portion of said envelope;
   whereby said tube is fixedly secured within said envelope.

2. Apparatus for securing a fragile cylindrical tube within a cylindrical envelope comprising at least two spaced apart mounting means disposed along the length of said tube and between said tube and said envelope, each of said mounting means comprising:
   (a) a ring-shaped holder having an inner diameter greater than the outer diameter of said tube, and an outer diameter smaller than the inner diameter of said envelope, said ring-shaped holder further being provided with three radially-oriented cylindrical through-holes, and
   (b) an elastic sphere disposed in each of said cylindrical through-holes;
   wherein said ring-shaped holders are provided with through-holes which are parallel to the axis thereof to provide passage for electrical leads and mechanical spacers.

3. Apparatus according to claim 1 or 2 in which each elastic sphere has a diameter greater than half of the difference between the inner diameter of the envelope and the outer diameter of the tube and smaller than the diameter of said radially-oriented cylindrical through-holes.

4. Apparatus according to claim 1 or 2 in which each of said elastic spheres is made of rubber, silicon rubber or plastic.

5. Apparatus according to claim 1 or 2 in which said ring-shaped holder is made of an electrical insulating material.

6. Apparatus according to claim 1 or 2 in which said tube is a laser tube.

* * * * *